United States Patent
Matthews et al.

(10) Patent No.: US 8,626,976 B2
(45) Date of Patent: *Jan. 7, 2014

(54) METHOD AND APPARATUS FOR PERFORMING A HOST ENUMERATION PROCESS

(75) Inventors: David L. Matthews, Houston, TX (US); Hubert E. Brinkmann, Houston, TX (US); Barry S. Basile, Houston, TX (US); Paul V. Brownell, Houston, TX (US); Kevin G Depew, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 153 days.

This patent is subject to a terminal disclaimer.

(21) Appl. No.: 12/919,050

(22) PCT Filed: Feb. 26, 2008

(86) PCT No.: PCT/US2008/002526
§ 371 (c)(1),
(2), (4) Date: Aug. 24, 2010

(87) PCT Pub. No.: WO2009/108146
PCT Pub. Date: Sep. 3, 2009

(65) Prior Publication Data
US 2011/0004688 A1   Jan. 6, 2011

(51) Int. Cl.
*G06F 13/20* (2006.01)
*G06F 13/36* (2006.01)
*G06F 3/00* (2006.01)
*G06F 9/00* (2006.01)
*G06F 13/00* (2006.01)
*G06F 13/38* (2006.01)
*G06F 13/40* (2006.01)
*G06F 9/44* (2006.01)
*H04L 29/08* (2006.01)
*H04L 12/24* (2006.01)

(52) U.S. Cl.
CPC .......... *G06F 13/385* (2013.01); *G06F 13/4027* (2013.01); *G06F 9/4401* (2013.01); *G06F 9/4411* (2013.01); *H04L 29/08144* (2013.01); *H04L 41/0213* (2013.01)
USPC ............... 710/313; 710/1; 710/104; 710/302; 710/306; 710/314; 713/2; 719/321; 709/223; 709/226

(58) Field of Classification Search
USPC ............ 709/203, 223, 226; 710/15, 100, 104, 710/64, 1–8, 300–314; 713/1, 2; 719/321, 719/328; 714/799; 711/166; 717/165; 726/22
See application file for complete search history.

(56) References Cited

U.S. PATENT DOCUMENTS 5,655,148 A * 8/1997 Richman et al. ................... 710/8
6,134,616 A   10/2000 Beatty (Continued)

FOREIGN PATENT DOCUMENTS

| JP | H11-288338 | 10/1999 |
| JP | 2001-228944 | 8/2001 |
| JP | 2005-317021 | 11/2005 |

OTHER PUBLICATIONS

International Search Report and Written Opinion, dated Nov. 26, 2008, 10 pages.

*Primary Examiner* — Wing F Chan
*Assistant Examiner* — Raji Krishnan

(57) ABSTRACT

A method and apparatus for host enumeration process. One embodiment of the method provides a bit to indicate to the host whether enumeration process should start or continue. The bit may be set when the shared resource process has been successfully completed, or the bit may be set if too much time has elapsed since the shared resource process has started, or the bit may be set if too much time has elapsed before the shared resource process is started, or the bit may be set if the shared resource process has not been performed successfully, or the bit may be set if the port is open and it is unnecessary to perform the shared resource process.

18 Claims, 5 Drawing Sheets

(56) References Cited

U.S. PATENT DOCUMENTS

| | | | |
|---|---|---|---|
| 6,279,060 B1* | 8/2001 | Luke et al. | 710/64 |
| 6,732,264 B1* | 5/2004 | Sun et al. | 713/2 |
| 6,754,817 B2* | 6/2004 | Khatri et al. | 713/1 |
| 7,058,738 B2* | 6/2006 | Stufflebeam, Jr. | 710/104 |
| 7,110,413 B2* | 9/2006 | Riley | 370/401 |
| 7,216,211 B2* | 5/2007 | Munguia et al. | 711/166 |
| 7,251,704 B2* | 7/2007 | Solomon et al. | 710/316 |
| 7,287,257 B2* | 10/2007 | Meza | 719/321 |
| 2002/0120924 A1* | 8/2002 | Miloushev et al. | 717/165 |
| 2002/0178316 A1 | 11/2002 | Schmisseur et al. | |
| 2003/0093510 A1* | 5/2003 | Cen | 709/223 |
| 2004/0073912 A1* | 4/2004 | Meza | 719/321 |
| 2005/0066108 A1 | 3/2005 | Zimmer et al. | |
| 2005/0246460 A1* | 11/2005 | Stufflebeam, Jr. | 710/104 |
| 2006/0242330 A1* | 10/2006 | Torudbakken et al. | 710/5 |
| 2007/0088943 A1* | 4/2007 | Phelps et al. | 713/2 |
| 2008/0256351 A1* | 10/2008 | Natarajan | 713/2 |
| 2010/0325332 A1* | 12/2010 | Matthews et al. | 710/305 |
| 2011/0082949 A1* | 4/2011 | Matthews et al. | 710/1 |

\* cited by examiner

METHOD AND APPARATUS FOR PERFORMING A HOST ENUMERATION PROCESS

BACKGROUND

This invention relates to a method and apparatus for performing a host enumeration process.

With today's increasingly complex and sophisticated computer networks, virtual switches are commonly used to facilitate the use of remote end devices. Typically, a host is connected to a virtual switch. The virtual switch facilitates the sharing of input/output ("I/O") devices that are physically disaggregated from the host. The virtual switch may be a Virtual peer-to-peer ("P2P") Bridge device, or other hardware or software that serves the same function as a virtual switch.

When the system is being powered on, all the devices in the system will begin their bootup processes. In order for the host to see any I/O devices, a middle manager would conduct a shared resource allocation process. The purpose of this process is to allocate resources for one or more of the end devices such that the devices would operate correctly.

During the bootup process, typically, the host would perform an enumeration process of its bus hierarchy as part of the bootup process. However, if the host enumerates its hierarchy before the shared resource allocation process has been completed by the middle manager, the I/O devices that are behind the virtual switch would not be seen by the host.

BRIEF DESCRIPTION OF THE DRAWINGS

The method and apparatus for performing a host enumeration process are further described with reference to the accompanying drawings in which.

DETAILED DESCRIPTION OF THE EMBODIMENTS

The embodiments of present invention described herein provide a method and apparatus for performing a host enumeration process. The embodiments utilize a bit in the BIOS, or a bit in the memory or hardware that may be read by the BIOS to instruct the host to perform its enumeration process after the shared resource allocation process is substantially completed by the middle manager to ensure that the I/O devices behind the virtual switch can be seen by the host. Without this feature, the host would continue the enumeration process regardless if the shared resource allocation process has been completed by the middle manager, resulting in some I/O devices not being seen by the host. Thus, without this feature, in order for those devices to be seen by the host, the devices may have to be reinstalled or rebooted, or, in the alternative, the host may have to be rebooted.

The method and apparatus for performing a host enumeration process may be used in any system with one or more virtual switches. In one exemplary embodiment, the system comprises one or more hosts, one or more virtual switches, and one or more end devices. This aspect of the embodiment may be illustrated by the block diagrams of FIGS. 1, 2 and 3.

Figure 1:
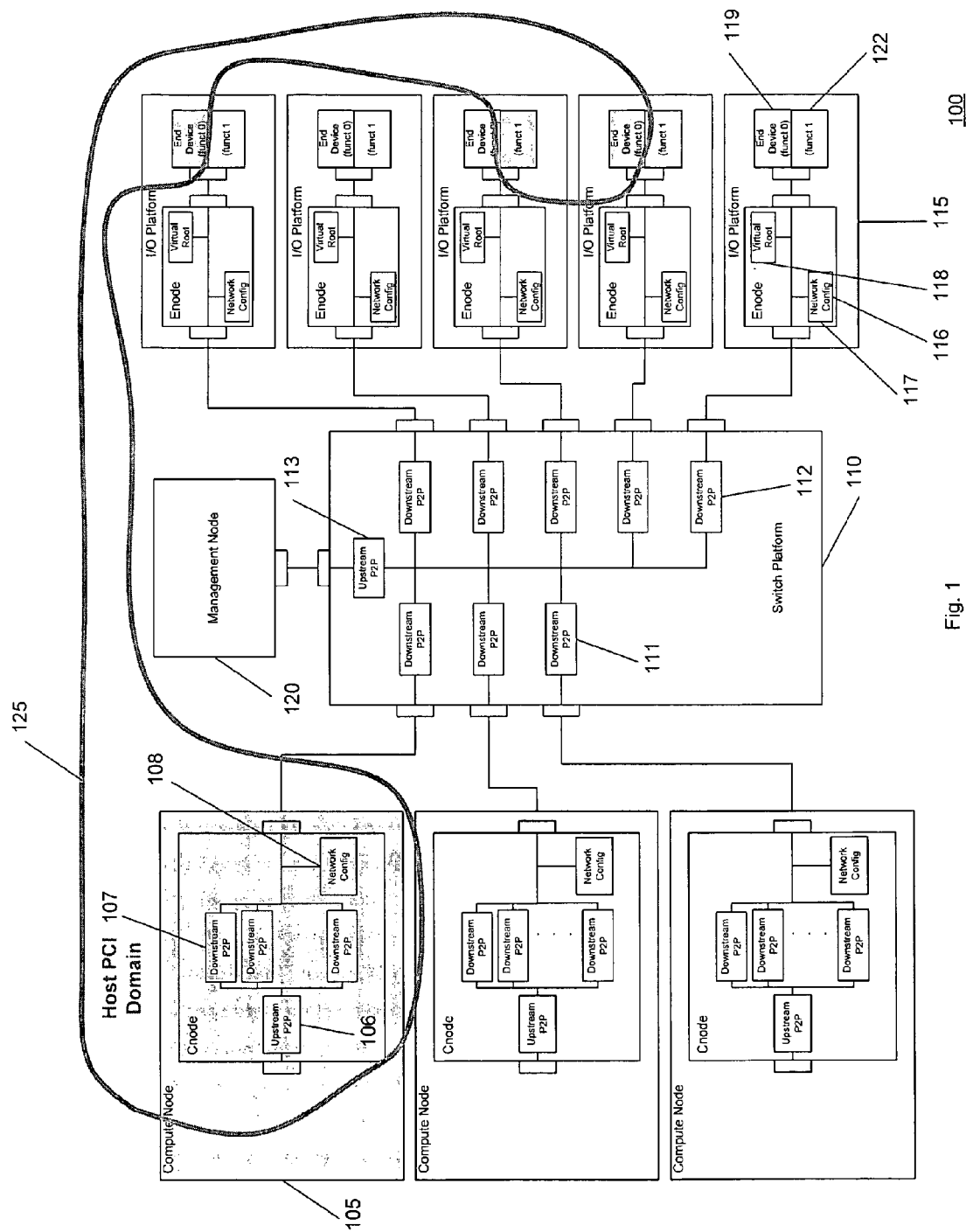
FIG. 1 is a block diagram showing an exemplary host domain.
Figure 2:
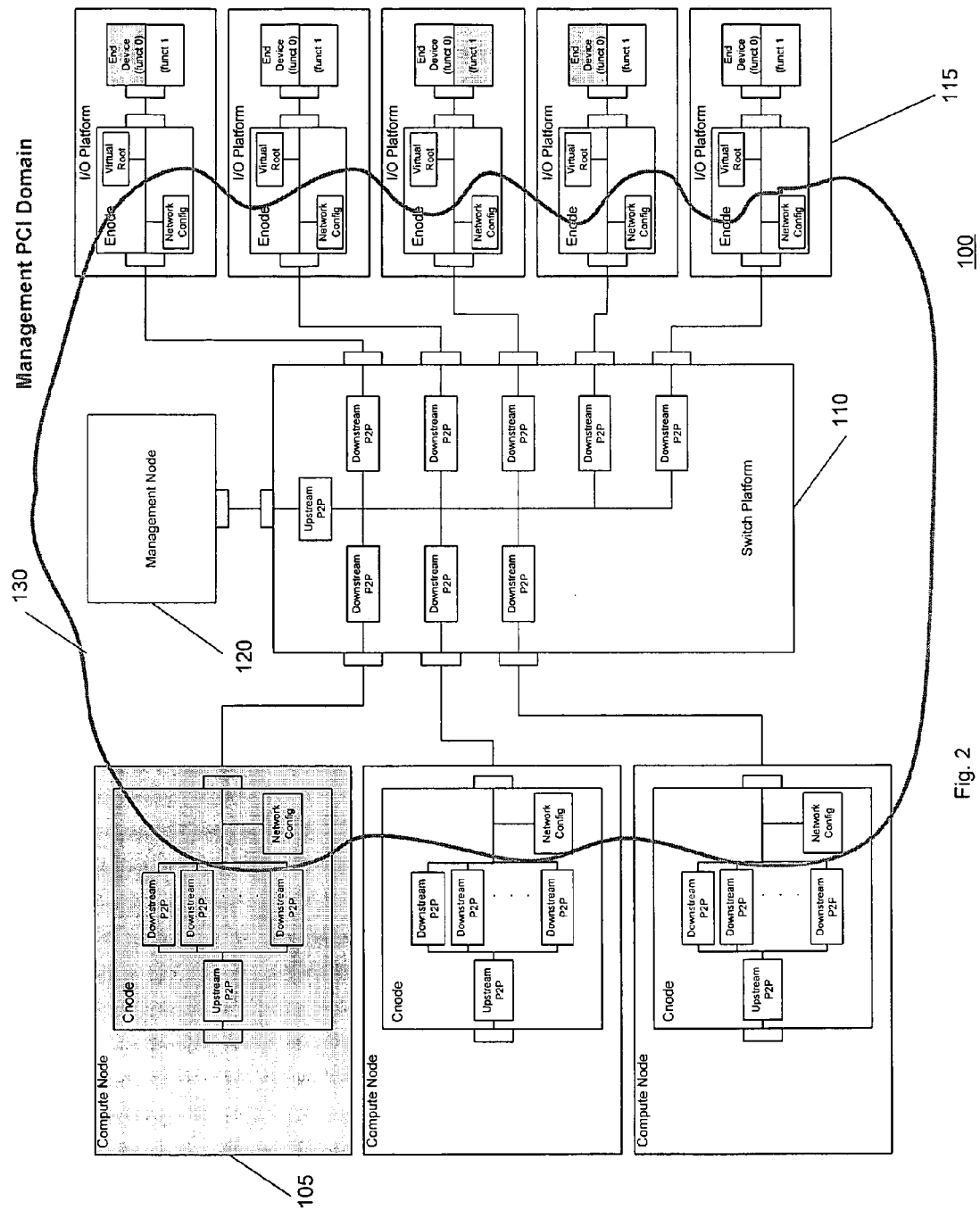
FIG. 2 is a block diagram showing an exemplary network domain.
Figure 3:
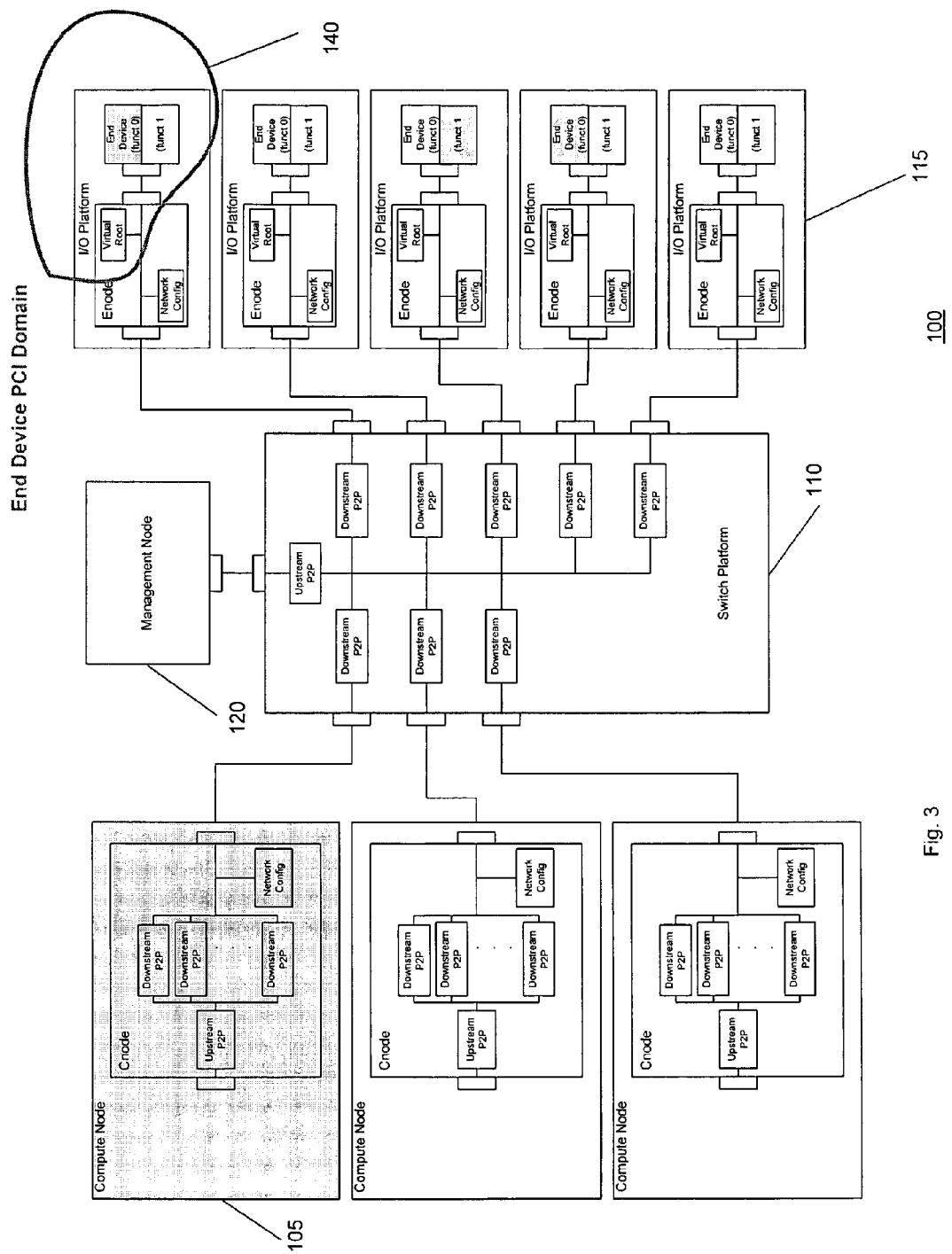
FIG. 3 is a block diagram showing an exemplary virtual root domain.

FIGS. 1, 2 and 3 show an exemplary computer system 100. As shown in the figures, the computer system 100 comprises one or more hosts (not shown), one or more virtual switches 105, one or more peripheral component interconnect ("PCI") switches 110, and one or more end devices 115. Each end device 115 may, but not necessarily, comprise an enode 116, a network configuration 117, a virtual root 118, and functionalities 119 and 122. In this exemplary computer system, the virtual switch 105 may be a virtual P2P bridge device, and the middle management 120 may own the shared I/O fabric and handles the shared resource allocation process. Each virtual switch 105 may, but not necessarily, comprise an upstream P2P 106 connected to the host machine, one or more downstream virtual P2P coupled (e.g., electrically, physically or otherwise connected) to the PCI switch, and a network endpoint config space 108 that belongs or may belong to the I/O fabric. The virtual switch 105 may be connected to a PCI switch 110. The PCI switch 110 may, but not necessarily, comprise an upstream P2P 113 connected to one or more downstream P2P 111 and 112. The downstream P2P 111 may be connected to the virtual switch 105 and the downstream P2P 112 may be connected to the end device 115. In the exemplary computer system 100, 125 shows an exemplary host PCI domain, 130 shows an exemplary management PCI domain, and 140 shows an exemplary end device PCI domain.

When the system is being powered on, the bootup process starts. At this time the host would start its bootup enumeration process and the middle management 120 would begin its shared resource allocation process to allocate resources for the end devices 115 that are behind the virtual switches 105. The middle management 120 may be hardware or software, and may reside in the host or virtual switch or any other component in the computer system.

When the shared resource allocation process is completed by the middle management 120, i.e., when resources have been allocated to the end devices, the host would now see the end devices. However, if the shared resources allocation process is not completed before the host enumeration process begins, resources would not have been allocated to the end devices in time for the host to see the end devices.

In order to prevent the early enumeration of the host, a "BIOS Go" bit is provided to stall the host. In other words, the host would not perform the enumeration process until the "BIOS Go" bit is set, indicating to the host that the shared resource allocation process is completed. There are many ways the host enumeration process may be stalled. For example, it may be performed by means of interrupting the host or polling activity by the host, or by holding the host in reset or powered off. In this exemplary illustration, the host BIOS bus enumeration process is stalled by providing the "BIOS Go" bit inside the virtual P2P device configuration space accessible by the BIOS. The "BIOS Go" bit may also be provided elsewhere depending on the computer system. For example, the "BIOS Go" bit may be implemented in either dedicated hardware register(s) or within a shared memory location that is accessible by both the middle management and host.

In this exemplary embodiment, the "BIOS Go" bit is deasserted at power on. The BIOS at the host then polls the "BIOS Go" bit while the shared resource allocation process is being performed by the middle management. Once the shared resource allocation process is completed, i.e. shared resources have been allocated to the end devices, the middle management would set the "BIOS Go" bit to indicate to the host that the shared resource allocation process has been completed. When the host polls the "BIOS Go" bit, the host would now recognize that it may start and/or continue with the enumeration process. In this exemplary illustration, the BIOS of the host would poll the "BIOS Go" bit and continue the enumeration process. When the enumeration process is completed, the host would now see the end devices because they are allocated to the host by the middle management, even though those end devices may or may not physically reside on the host machine. The host may continuously or periodically poll the "BIOS Go" bit, or the host may poll the "BIOS Go" bit in a particular variation of sequence depending on the computer system. In addition, there are also many other possible embodiments. For example, the host may be interrupted, powered up, or brought out of reset when the "BIOS Go" bit is set.

Figure 4:
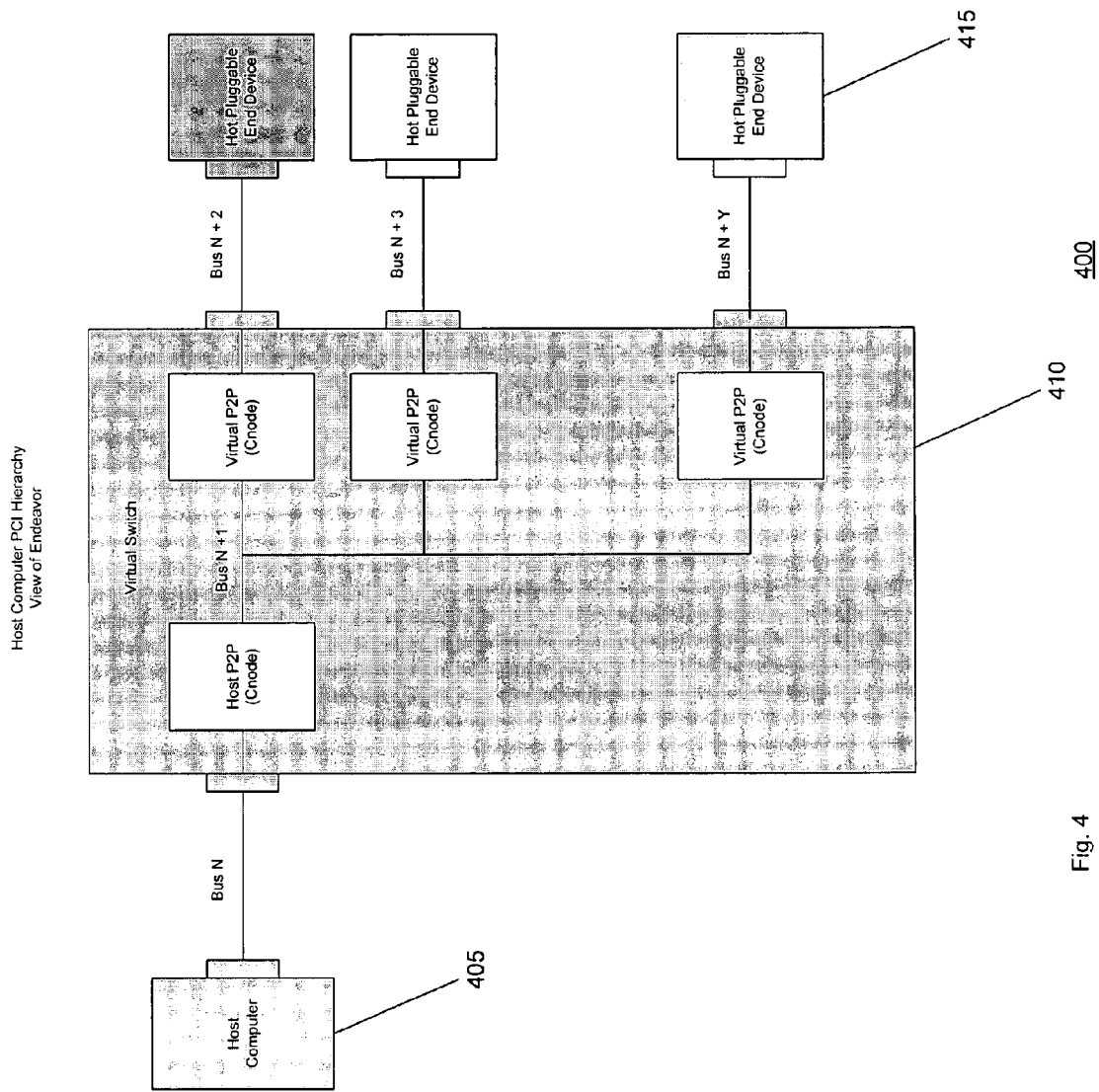
FIG. 4 is a block diagram showing a higher level view of an exemplary host, virtual switch and end device system.

FIG. 4 shows a hierarchy view of an exemplary embodiment of the present invention. The exemplary computer system in FIG. 4 comprises a host computer 405, a virtual switch 410, and one or more end devices 415. As shown in FIG. 4, the virtual switch 410 may comprise a host P2P and one or more virtual P2P. In this exemplary illustration, the middle management may reside in the virtual switch and would perform the shared resource allocation process. In this exemplary embodiment, the host computer 405, a virtual switch 410, and one or more end devices 415 may, but not necessarily, have configurations and functionality similar to the host, virtual switch 105 and end device 115 shown in FIGS. 1-3.

When the system is powered on, a "BIOS Go" bit would be deasserted and the middle management starts the shared resource allocation process. The host would poll the "BIOS Go" bit and recognize that the enumeration should be stalled because the middle management is performing the shared resource allocation process.

Once the shared resource allocation process is completed, the "BIOS Go" bit would be set. The host then may poll the "BIOS Go" bit and may recognize that the enumeration may now continue. The end devices that are behind the virtual switch would be seen by the host computer after the enumeration process because resources have been allocated to the end devices, even though the end devices may or may not be physically connected to the host machine.

In another exemplary embodiment of the present invention, the "BIOS Go" bit may be set by one or more factors other than the completion of the shared resource allocation process. For example, if there are no end devices behind the virtual switch, the "BIOS Go" bit would be set so that the host may continue its enumeration process without any unnecessary delay. In another example, the "BIOS Go" bit may be set if too much time has elapsed after the shared resource allocation process has begun. This would ensure the host would continue its enumeration process even if the shared resource allocation process is stalled or unsuccessful for any reason, or if the shared resource allocation process is taking longer than desired. The duration of time for this "time-out" setting may be varied depending on the computer system. In another example, the "BIOS Go" bit may be set if too much time has elapsed before the shared resource allocation process begins. This would ensure the host would continue its enumeration process even if the shared resource allocation process never started for any reason, or is unsuccessful for any reason. The duration of time for this time-out setting may be varied depending on the computer system. Furthermore, all of these factors may be combined in a logical setting such that any one of the factors may set the "BIOS Go" bit such that the host enumeration process may continue.

Figure 5:
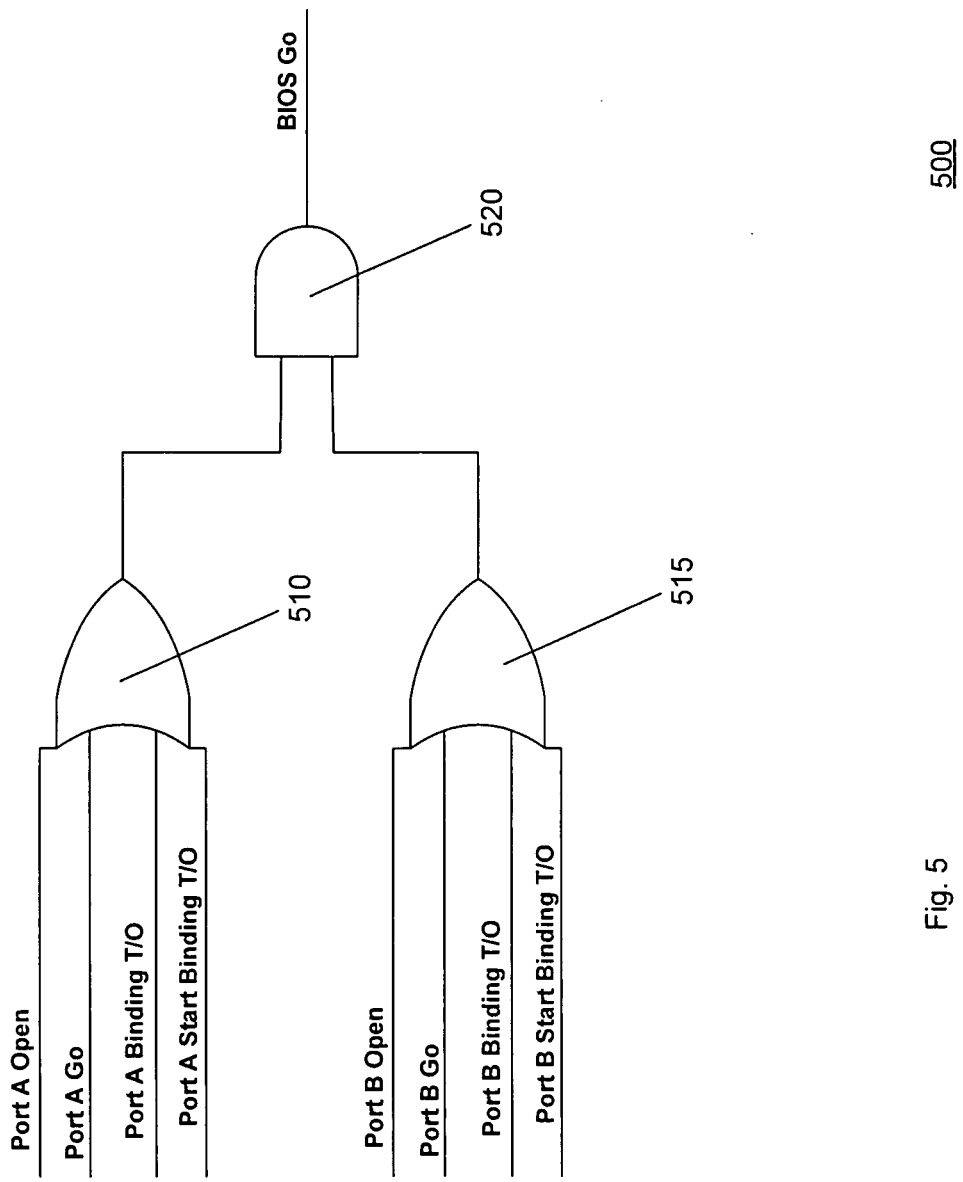
FIG. 5 is a logic diagram of a multi-port usage of an exemplary embodiment of the present invention.

In another exemplary embodiment of the present invention, the "BIOS Go" bit may be controlled by multiple ports. This embodiment may be used with multiple hosts, multiple virtual switches, or multiple middle management. Each of the multiple hosts, multiple virtual switches, or multiple middle management can be represented by a port. In this exemplary embodiment, the "BIOS Go" bit may be set when all the ports indicated that the "BIOS Go" bit should be set. FIG. 5 is a logic diagram of an exemplary illustration of the "BIOS Go" bit being controlled by two ports, port A and port B. In this example, multiple inputs controls the OR gate 510 regarding port A and multiple inputs controls the OR gate 515 regarding port B. The output of the OR gates 510 and 515 becomes the input of the AND gate 520. As illustrated by FIG. 5, there are four inputs to the OR gate 510: "Port A Open," "Port A Go," "Port A Binding T/O," and "Port A start Binding T/O." Thus, in this example, if port A is open for any reason, such as no device being connected, or in some cases, there may not be a middle management in the system, the "Port A Open" input would cause the output of OR gate 510 to be set. Similarly, if the shared resource allocation process for port A has been completed, the "Port A Go" input would cause the output of OR gate 510 to be set. A timer may be used to track whether the shared resource allocation process completes in a reasonable amount of time. For example, a "binding" timer may begin when the shared resource allocation process starts. If too much time has elapsed since the shared resource allocation process has begun and the shared resource allocation process is not yet completed, i.e., if the duration of the "binding" timer exceeds a certain time-out threshold, the "Port A Binding T/O" would cause the output of OR gate 510 to be set. A timer may also be used to track whether the shared resource allocation process begins within a reasonable amount of time. For example, a "start binding" timer may begin at power up and may be reset or paused when the shared resource allocation process begins. If too much time has elapsed and the shared resource allocation process still has not begun, i.e. if the duration of the "start binding" timer exceeds a certain time-out threshold, the "Port A Start Binding T/O" would cause the output of OR gate 510 to be set.

Following the same exemplary illustration of FIG. 5, there are four inputs to the OR gate 515: "Port B Open," "Port B Go," "Port B Binding T/O," and "Port B start Binding T/O." Thus, in this example, if port B is open for any reason, such as no device being connected, the "Port B Open" input would cause the output of OR gate 515 to be set. Similarly, if the shared resource allocation process for port B has been completed, the "Port B Go" input would cause the output of OR gate 515 to be set. A timer may be used to track whether the shared resource allocation process completes in a reasonable amount of time. For example, a "binding" timer may begin when the shared resource allocation process starts. If too much time has elapsed since the shared resource allocation process has begun and the shared resource allocation process is not yet completed, i.e., if the duration of the "binding" timer exceeds a certain time-out threshold, the "Port B Binding T/O" would cause the output of OR gate 515 to be set. A timer may also be used to track whether the shared resource allocation process begins within a reasonable amount of time. For example, a "start binding" timer may begin at power up and may be reset or paused when the shared resource allocation begins. If too much time has elapsed and the shared resource allocation process still has not begun, i.e. if the duration of the "start binding" timer exceeds a certain time-out threshold, the "Port B Start Binding T/O" would cause the output of OR gate 515 to be set.

Continuing the same exemplary illustration of FIG. 5, when the output of OR gates 510 and 515 are fed as inputs to AND gate 520, the "BIOS Go" bit is either deasserted or set. If the output of both OR gates 510 and 515 indicate that the "BIOS Go" bit should be set, the "BIOS Go" bit would be set. On the other hand, if any or both the outputs of OR gates 510 and 515 indicate that the "BIOS Go" bit should not be set, the "BIOS Go" bit would not be set. In other words, if the output of OR gate 510 indicates that the "BIOS Go" bit should not be set, the "BIOS Go" bit would not be set. If the output of OR gate 515 indicates that the "BIOS Go" bit should not be set, the "BIOS Go" bit would not be set. If both the output of OR gates 510 and 515 indicate that the "BIOS Go" bit should not be set, the "BIOS Go" bit would not be set.

The exemplary illustration of FIG. 5 comprises two ports; however, more ports may be used following the same logic. Furthermore, each ports may comprise different inputs that controls whether the "BIOS Go" bit should be set. For example, Port A may only have two inputs "Port A Open," and "Port A Go;" while Port B may have four inputs "Port B Open," "Port B Go," "Port B Binding T/O," and "Port B Start Binding T/O." Accordingly, subsequent ports may have different inputs.

It is understood that the herein described apparatus and methods are susceptible to various modifications and alternative constructions. There is no intention to limit the invention to the specific constructions described herein. To the contrary, the invention is intended to cover all modifications, alternative constructions, and equivalents falling within the scope and spirit of the invention.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention.

What is claimed is:

1. A method of performing a host enumeration process, comprising the steps of:
   providing a bit to indicate whether the host enumeration process will proceed;
   performing a shared resource allocation process by a middle manager for an end device that is behind a virtual switch that is connected to a host;
   setting the bit to indicate host enumeration process will proceed if the shared resource allocation process is completed successfully; and
   discontinuing the host enumeration process until the shared resource allocation process is completed and thereafter continuing the host enumeration process.

2. The method as recited in claim 1, further comprises:
   polling the bit to determine whether the host enumeration process will proceed;
   proceeding with the host enumeration process if the bit indicates the host enumeration process will proceed; and
   stalling the host enumeration process if the bit indicates the host enumeration process will not proceed.

3. The method as recited in claim 1, further comprises:
   providing a timer to track elapsed time after the start of the shared resource allocation process; and
   setting the bit to indicate the host enumeration process will proceed if the time elapsed after the start of the shared resource allocation process exceeds a threshold.

4. The method as recited in claim 1, further comprises:
   providing a timer to track elapsed time before the start of the shared resource allocation process; and
   setting the bit to indicate the host enumeration process will proceed if the time elapsed before the start of the shared resource allocation process exceeds a threshold.

5. The method as recited in claim 1, further comprises:
   setting the bit to indicate the host enumeration process will proceed if the shared resource allocation process fails.

6. The method as recited in claim 1, further comprises:
   performing multiple shared resource allocation processes;
   setting the bit to indicate the host enumeration process will proceed if all the shared resource allocation processes are completed successfully.

7. The method as recited in claim 1, further comprising:
   determining whether performing the shared resource allocation process is necessary; and
   setting the bit to indicate the host enumeration process will proceed if the determination indicates that performing the shared resource allocation process is not necessary.

8. The method as recited in claim 1, further comprising:
   providing a binding timer to track elapsed time after the start of the shared resource allocation process;
   providing a start-binding timer to track elapsed time before the start of the shared resource allocation process;
   determining whether performing the shared resource allocation process is necessary; and
   setting the bit to indicate host enumeration process will proceed if the shared resource allocation process is completed successfully; or
   the time elapsed after the start of the shared resource allocation process exceeds a threshold; or
   the time elapsed before the start of the shared resource allocation process exceeds a threshold; or
   the determination indicates that performing the shared resource allocation process is not necessary.

9. The method as recited in claim 2, wherein the step of stalling the host enumeration process comprises at least one of:
   interrupting the host;
   polling activity by the host;
   holding the host in reset; or
   holding the host in power off.

10. A computer network, comprising:
    at least one host;
    at least one virtual switch connected to the host;
    at least one end device connected behind the virtual switch;
    at least one middle manager to perform a shared resource allocation process for the at least one end device; and
    at least one bit to indicate whether a host enumeration process will proceed;
    wherein the middle manager sets the bit to indicate the host enumeration process will proceed if the shared resource allocation process is completed successfully and the host discontinues the host enumeration process until the shared resource allocation is completed and thereafter continues the host enumeration process.

11. The computer network as recited in claim 10, wherein:
    the host polls the bit to determine whether the host enumeration process will proceed;
    the host starts or continues the host enumeration process if the bit indicates the host enumeration process will proceed; and
    the host stalls the host enumeration process if the bit indicates the host enumeration process will not proceed.

12. The computer network as recited in claim 10, further comprising:
    a binding timer to track elapsed time after the shared resource allocation process has started;

wherein the middle manager sets the bit to indicate the host enumeration process will proceed if the time elapsed after the start of shared resource allocation process exceeds a threshold.

13. The computer network as recited in claim 10, further comprises:
a start-binding timer to track elapsed time before the start of the shared resource allocation process;
wherein the middle manager sets the bit to indicate the host enumeration process will proceed if the time elapsed before the start of the shared resource allocation process exceeds a threshold.

14. The computer network as recited in claim 10, wherein:
the middle manager sets the bit to indicate the host enumeration process will proceed if the shared resource allocation process fails.

15. The computer network as recited in claim 10, wherein:
the middle manager performs more than one shared resource allocation processes; and
the middle manager sets the bit to indicate the host enumeration process will proceed if all the shared resource allocation process is completed successfully.

16. The computer network as recited in claim 10, wherein:
the middle manager determines whether performing the shared resource allocation process is necessary; and
the middle manager sets the bit to indicate host enumeration process will proceed if the determination indicates that performing the shared resource allocation process is not necessary.

17. The computer network as recited in claim 10, further comprising:
a binding timer to track elapsed time after the shared resource allocation process has started; and
a start-binding timer to track elapsed time before the start of the shared resource allocation process;
wherein:
the middle manager determines whether performing the shared resource allocation process is necessary;
the middle manager sets the bit to indicate host enumeration process will proceed if the shared resource allocation process is completed successfully; or
the time elapsed after the start of the shared resource allocation process exceeds a threshold; or
the time elapsed before the start of the shared resource allocation process exceeds a threshold; or
the determination indicates that performing the shared resource allocation process is not necessary.

18. The computer system as recited in claim 11, wherein the host stalls enumeration process by at least one of:
interrupting the host;
polling activity by the host;
holding the host in reset; or
holding the host in power off.

* * * * *